United States Patent
Harris et al.

(10) Patent No.: US 8,090,037 B1
(45) Date of Patent: Jan. 3, 2012

(54) OFDM MODULATION USING A SHAPING FILTER

(75) Inventors: Fredric J. Harris, Lemon Grove, CA (US); Christopher Dick, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 596 days.

(21) Appl. No.: 12/260,028

(22) Filed: Oct. 28, 2008

(51) Int. Cl.
*H04L 27/28* (2006.01)

(52) U.S. Cl. ........................ 375/260

(58) Field of Classification Search ............. 375/259, 375/260, 240.18; 342/196; 708/404, 405; 379/406.13; 370/210
See application file for complete search history.

(56) References Cited

U.S. PATENT DOCUMENTS

| | | | | |
|---|---|---|---|---|
| 2002/0105901 | A1* | 8/2002 | Chini et al. | 370/206 |
| 2007/0201354 | A1* | 8/2007 | Oh et al. | 370/210 |
| 2007/0263738 | A1* | 11/2007 | Jitsukawa et al. | 375/260 |
| 2009/0147669 | A1* | 6/2009 | Green | 370/215 |

OTHER PUBLICATIONS

Nassar, Carl R. et al., "Multi-Carrier Technologies for Wireless Communications", Kluwer Academic Publishers, 2002, Chapter 2.3, "The Carrier Interferometry (CI) Approach".

Myung, Hyung G. et al., "Single Carrier FDMA Uplink Wireless Transmission", IEEE Vehicular Technology Magazine, Sep. 2006, pp. 30-38.

Harris, Fred, et al, "An Improved Square Root Nyquist Filter" SDR-2005.

Harris, Fredric J., et al., On Trading Excess Bandwidth for Reduced Peak to Average Power Ratio in Single Carrier Shaped Dirichlet Kernel OFDM, Software Defined Radio Conference (SDR-2008), Washington DC, Oct. 26-29, 2008, 5 pgs.

Harris, Fredric J., et al., OFDM Modulation Using Square-Root Nyquist Time Domain Kernels to Obtain Reduced Peak-to-Average Power Ratio, Wireless Personal Mobile Communications (WPMC-2008), Sep. 8-11, 2008, Lapland, Finland, 4 pgs.

Harris, Fredric J., Multirate Signal Processing for Communication Systems, Prentice Hall, May 2004, Chapter 4, pp. 82-105.

Harris, Fredric J., et al., OFDM Modulation Using Periodic Square-Root Nyquist Time Domain Kernels to Obtain Reduced Peak-to-Average Power Ratio, Wireless Personal Mobile Communications, San Diego, CA, Jun. 22, 2008, 5 pgs.

* cited by examiner

*Primary Examiner* — Sam K Ahn

(74) *Attorney, Agent, or Firm* — W. Eric Webostad; John J. King

(57) ABSTRACT

Reducing peak-to-average power ratio ("PAPR") for modulation and demodulation is described. Complex sample values are obtained in a time domain for orthogonal frequency division multiplexed ("OFDM") signaling. The complex sample values are transformed into a frequency domain. The set of spectral samples is multiplied with a filter spectrum to shape the set of spectral samples to provide spectral products.

18 Claims, 13 Drawing Sheets

US 8,090,037 B1

OFDM MODULATION USING A SHAPING FILTER

FIELD OF THE INVENTION

The invention relates to communication. More particularly, the invention relates to an orthogonal frequency division multiplexed ("OFDM") modulation using a shaping filter to reduce Peak-to-Average Power Ratio ("PAPR") by control of time domain sidelobe levels.

BACKGROUND OF THE INVENTION

Standard OFDM signals are formed as a weighted sum of orthogonal sampled data sine waves. Signals formed by this sum exhibit a large peak-to-average power ratio ("PAPR"). Having a large PAPR is generally undesirable as it leads to poor power efficiency in an amplifier. The 4-to-1 peak-to-average amplitude ratio is associated with a Rayleigh envelope which exhibits a large ratio of peak-to-average value with peak values generally exceeding approximately four times the average value with a probability of approximately 0.00035. In other words, to preserve fidelity of an OFDM time signal and to avoid spectral artifacts due to amplifier clipping, the amplifier may be operated with an average signal level at one-fourth of full scale. In other words, suppose for example that signals are to be passed with a 4-to-1 peak-to-average amplitude ratio through a power amplifier, such a peak power level would be 16 times the average power level. This means that an amplifier designed to deliver five watts of average power would have to be capable of delivering 80 watts of peak power. Furthermore, it should be understood that power amplifiers are generally inefficient in their transduction process of turning DC power into signal power when they are operating at small fractions of their peak power level.

Accordingly, it would be desirable and useful to reduce peak-to-average power levels of a transmitted signal. Along those lines, reductions in PAPR may result in significant reduction in power supply draw and waste heat used to deliver a specified average power.

SUMMARY OF THE INVENTION

One or more aspects generally relate to an orthogonal frequency division multiplexed ("OFDM") modulation using a shaping filter to reduce Peak-to-Average Power Ratio ("PAPR") by control of time domain sidelobe levels.

An aspect relates generally to an OFDM modulator. The OFDM modulator has a Fourier Transform block coupled to receive first values in the time domain and configured to transform the first values into second values in the frequency domain. An up-sampler is coupled to receive the second values and configured to up-sample the second values to provide third values. The third values are greater in number than the second values. A multiplier is coupled to receive the third values. A shaping filter has a spectrum which is coupled to the multiplier. The multiplier is configured to multiply the third values with the spectrum to shape and interpolate the third values to provide fourth values which are spectral products. The spectral products are shaped responsive to the spectrum of the shaping filter. An Inverse Fourier Transform block transforms the spectral products into fifth values that represent modulated OFDM signaling.

Another aspect relates generally to an OFDM demodulator. A Fourier Transform block is coupled to receive first values in the time domain and configured to transform the first values into second values in the frequency domain. A first multiplier is coupled to receive the second values. A shaping matched filter has a spectrum and is coupled to the first multiplier, which is configured to multiply the second values with the spectrum to shape the second values to provide third values as spectral products. The spectral products are shaped responsive to the spectrum of the shaping filter. A second multiplier is coupled to receive the third values and is coupled to an equalizer filter having a channel equalizer spectrum. The second multiplier is configured to multiply the third values with the channel equalizer spectrum to provide fourth values. A first output array buffer is coupled for receiving the fourth values, and a second output array buffer is coupled to the first output array buffer for folding part of a spectrum represented by the fourth values for aliasing thereof to provide fifth values. The fifth values are the folded part of the fourth values and a remainder of the fourth values. An Inverse Fourier Transform block is coupled to receive the fifth values and is configured to transform the fifth values to the time domain to provide sixth values. The sixth values represent demodulated OFDM signaling.

Yet another aspect relates generally to a method for OFDM modulation. First complex sample values are obtained in the time domain for OFDM signaling. The first complex sample values are transformed into the frequency domain. The first complex sample values are up-sampled in the frequency domain to provide a set of spectral samples in the frequency domain. The set of spectral samples is multiplied with a filter spectrum to shape and interpolate the set of spectral samples to provide spectral products. The spectral products are shaped responsive to the filter spectrum. The shaped spectral products are transformed back to the time domain to provide second complex sample values.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same or similar items; however, in alternative embodiments the items may be different.

Figure 1:
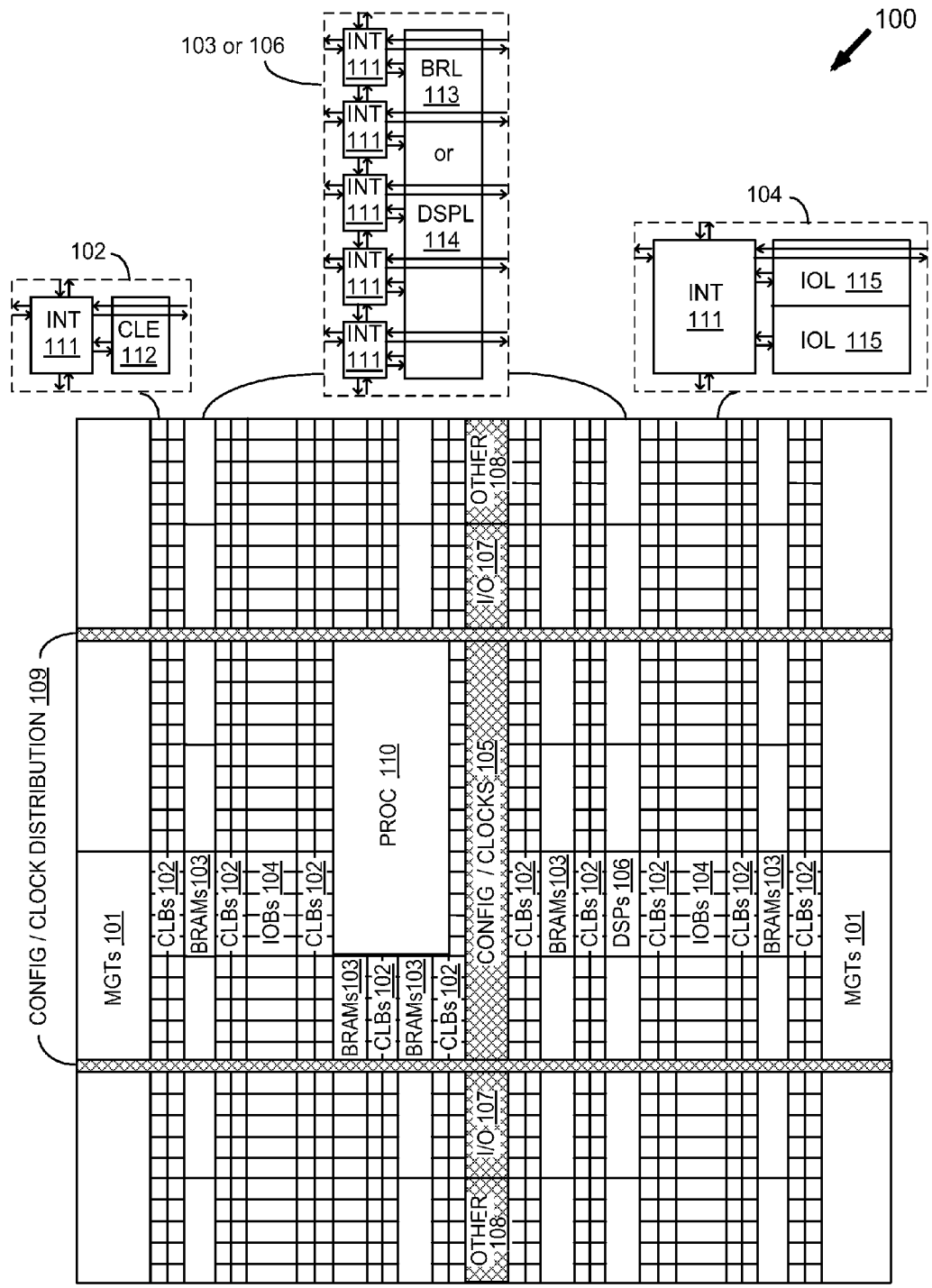
FIG. 1 is a simplified block diagram depicting an exemplary embodiment of a columnar Field Programmable Gate Array ("FPGA") architecture in which one or more aspects of the invention may be implemented.

Advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
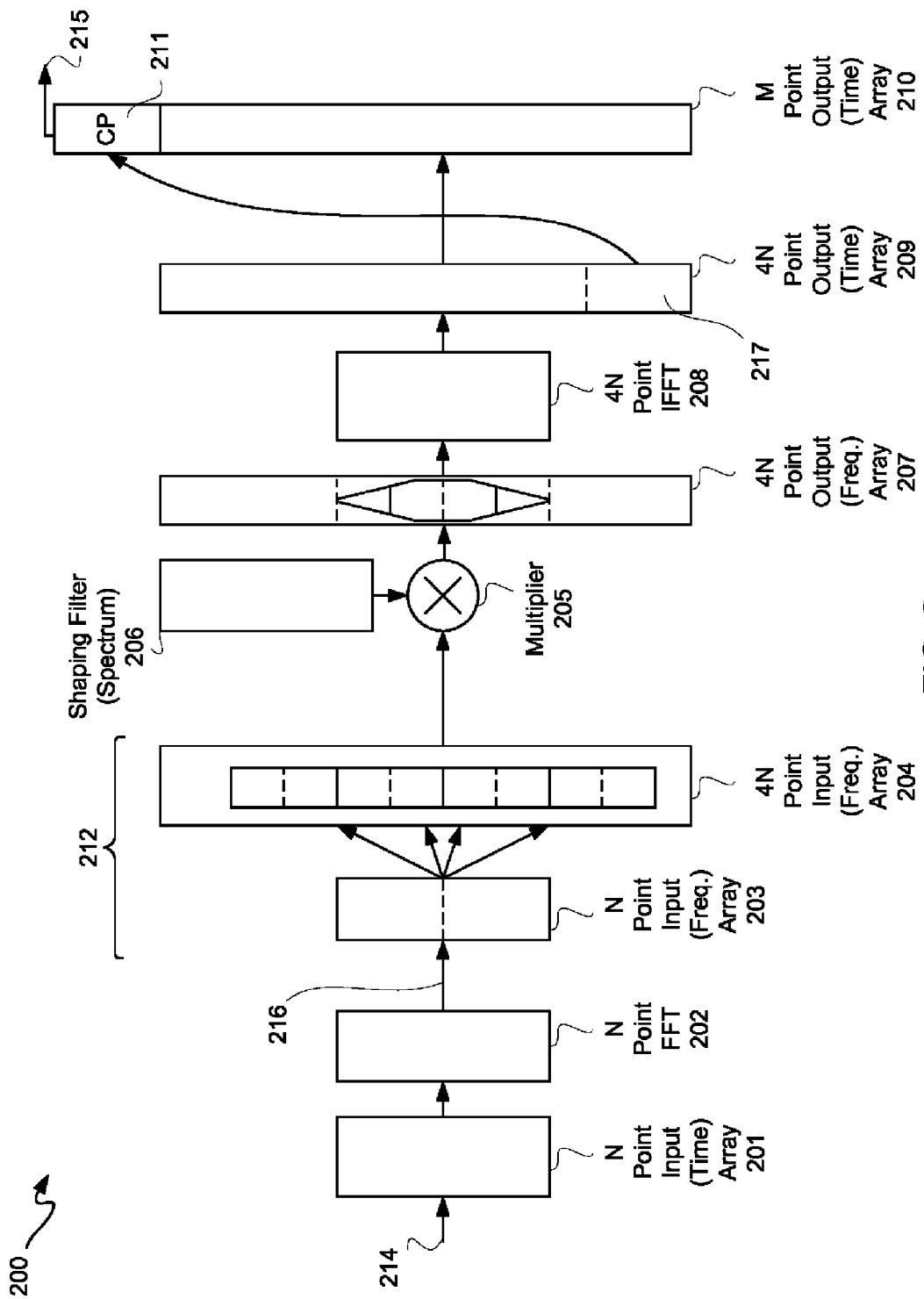
FIG. 2 is a block diagram of a shaped periodic (Dirichlet-like) kernel orthogonal frequency division multiplexed ("OFDM") modulator.

FIG. 2 is a block diagram of a shaped Dirichlet kernel OFDM modulator ("modulator") 200. Modulator 200 includes Fast Fourier Transform ("FFT") block 202, inverse FFT ("IFFT") block 208, input arrays 201, 203, and 204, output arrays 207, 209, and 210, filter spectrum 206, and multiplier 205. Modulator 200 may be implemented in FPGA 100 of FIG. 1, where arrays 201, 203, 204, 207, 209, and 210 are implemented with BRAMs. In other instances, part or all of modulator 200 may be implemented in other devices, such as a digital signal processor, a microprocessor, or an ASIC.

Modulator 200 uses an FFT block 202 as an interpolator. Complex sample values ("values") 214 are input to an N point input array 201. Values 214 enter modulator 200 in the time domain, and such values are to be output as amplitudes. More particularly, for modulator 200, amplitudes 215 output in the time domain are output as square root (Dirichlet-like) kernels.

For purposes of clarity by way of example and not limitation, it shall be assumed that N is equal to 64; however, it should be appreciated that other positive integers may be used for N. Accordingly, N input complex sample values 214 are placed in input array 201. Input array 201 may be implemented using random access memory or other integrated circuit storage. Thus, input array 201 acts as a buffer.

Output from input array 201 is provided to FFT block 202 in preparation for interpolation and filter shaping. FFT block 202 outputs frequency domain output samples 216, which are input to input array 203. Output samples 216 are in the frequency domain after processing with FFT block 202. Input array 203 and input array 204 in combination act as a frequency domain up-sampler. The up-sampling is performed by inserting multiple replicas of the content of array 203 into array 204. This up-sampling is equivalent to zero-packing the time domain samples in array 201 and performing a larger FFT in block 202. For purposes of clarity by way of example and not limitation, it shall be assumed that a 1-to-4 up-sampling is performed; however, it should be appreciated that other ratios of up-sampling may be implemented. Furthermore, in accordance with the example, there are 256 interpolated, up-sampled points stored in input array 204. The up-sampling is performed in the frequency domain, and thus the 64 spectral complex samples 216 in input array 203 are up-sampled to form a 256-point spectral array for storage in input array 204.

By having modulator 200 configured to sample, for example in this example four times the input symbol rate, spectral copies may be suppressed by subsequent digital signal processing filtering to simplify analog signal conditioning of the digital-to-analog conversion process. A 256-point transform on the 1-to-4 zero-packed 64-point input series to input array 204 may be performed to obtain a four-fold replica in the frequency domain of such samples. Another alternative may be to copy the 64 spectral samples from input array 203 into 256-point spectral addresses four times, which may be thought of as the original spectral samples in input array 203 and three copies of thereof. With the first two alternatives to populating input array 204 with 256 points of a spectral array, spectral replicas may be suppressed by spectral gain of a shaping filter, namely filter spectrum 206. Because filter spectrum 206 is centered on the DC, a centered band, and the immediate two neighbors of such centered band, three copies are sufficient to implement the modulator. With respect to copying spectral points, a replicated spectrum may be weighted by filter spectrum 206 as spectral response, where the interpolated 1-to-4 time series may be formed of such modified spectra by IFFT block 208.

The 256-point output from input array 204 is output to multiplier 205. To reduce sidelobes, filter spectrum or shaping filter 206 may be used. As described herein, the time domain sidelobes of the time kernel of the OFDM signaling waveform are controlled, namely interpolated and shaped, by using a spectrally shaped filter, rather than the operation of a window applied to the time domain impulse response. Filter spectrum 206 may be configured to obtain direct and finer control of the spectral expansion than would be associated with a window operation. A choice for filter spectrum 206 may be a cosine tapered square root-Nyquist filter. However, such a cosine tapered square root-Nyquist filter may not be optimal for spectral shaping. An alternative to the square root-Nyquist filter may be a harris-Nyquist-2 filter, as described in additional detail in "Multirate Signal Processing for Communication Systems" by fredric j. harris, published by Prentice Hall in 2004. Another choice for filter spectrum 206 may be a harris-Moerder filter, as described in additional detail in "An Improved Square Root-Nyquist Filter" by fred harris, Chris Dick, Karl Moerder, and Sridhar Seshigari, published in SDR in 2005. In other embodiments, equivalent variants of the above-mentioned filters, which are known in the art, may also be used. For purposes of clarity by way of example and not limitation, it shall be assumed that the harris-Moerder filter is used for filter spectrum 206.

Output of filter spectrum 206 is provided to multiplier 205 for directly controlling spectral expansion. Effectively, the output of multiplier 205 is a multiplication of output of filter spectrum 206 and spectra from input array 204 for providing as an input to output array 207. Output of multiplier 205 is in the frequency domain as a spectral product with shaping by the spectrum of a filter spectrum or shaping filter 206. The 256-point spectral product is input to output array 207, and output of output array 207 is provided to IFFT block 208.

Output of IFFT block 208 is an up-sampled and a spectrally shaped time series is provided as an input to output array 209. In short, the 256-point spectrum of output array 207 is inverted by the 256-point IFFT block 208 to provide 256 shaped samples for storage in output array 209 in the time domain. The content of array 209 is in turn copied into array 210. An end number of points or portion 217 stored in output array 209 is also copied or appended to the front of array 210 as a cyclic prefix ("CP") 211.

The 256-point shaped samples in output array 209 are provided as an input M-point output array 210 where M is equal to the number of points in portion 217 plus the total number of points or samples in output array 209, which for the above example will make M equal to 320.

The content of array 210 is presented to a remainder of a modulator processing chain of modulator 200. As this remainder is conventional, it is not shown here for purposes of clarity and not limitation.

Figure 3:
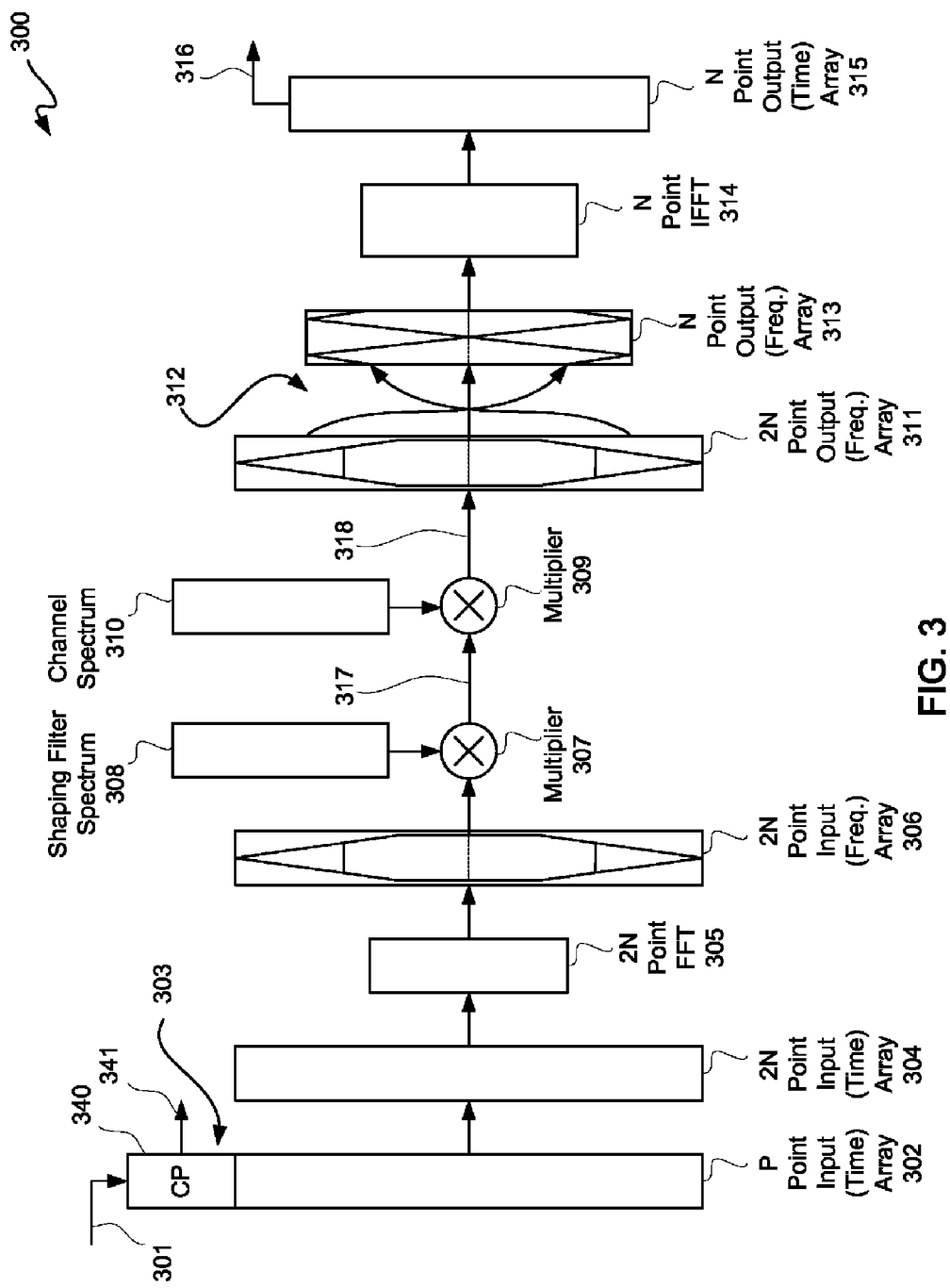
FIG. 3 is a block diagram of a shaped periodic (Dirichlet-like) kernel OFDM demodulator.

FIG. 3 is a block diagram of a shaped periodic (Dirichlet-like) kernel OFDM demodulator ("demodulator") 300. Demodulator 300 includes FFT block 305, IFFT block 314, input arrays 302, 304 and 306, output arrays 311, 313, and 315, filter spectrum ("array") 308, channel spectrum ("array") 310, and multipliers 307 and 309. Modulator 300 may be implemented in FPGA 100 of FIG. 1, where arrays 302, 304, 306, 308, 310, 311, 313, and 315 are implemented with BRAMs.

Demodulator 300 uses FFT block 305 and IFFT block 314 to implement a matched filter and a channel equalizer. Complex sample values ("values") 301 are input to a P point input array 302. Values 301 enter modulator 300 in the time domain, and such values are to be output as amplitudes. More particularly, for modulator 300, amplitudes 301 input in the time domain are output as matched filtered, channel equalized, and down-sampled sample estimates of the input sequence input to modulator 200 of FIG. 2.

For purposes of clarity by way of example and not limitation, the example value of N equal to 64 is continued here; however, it should be appreciated that other positive integers may be used for N. Continuing with this example size, P, the length of the input array 302 is 160, namely half the length of output array 210 in modulator 200. This is because the sample rate at the input to demodulator 300 may be selected to be half the sample rate of the output of modulator 200. Other ratios of input and output sample rate may alternatively be selected. Accordingly, P input complex sample values 301 are placed in input array 302. Input array 302 may be implemented using random access memory or other integrated circuit storage. Thus, input array 302 acts as a buffer.

Array 302 is configured to delineate a segment 303. Segment 303 of input array 302 is recognized as samples 340 of CP 211 inserted at the output of modulator 200 and is discarded as generally indicated by output 341 at the input to demodulator 300 as the length 2N portion of the received time series is moved to input array 304. Input time array 304 is transformed to the frequency domain by 2N point FFT block 305. The processed result of FFT block 305 is placed in 2N point input frequency array 306. The spectrum in shaping filter 306 is used to shape content in input array 306. The content in input array 306 is multiplied with the spectrum of shaping filter 306 by multiplier 307 to obtain a matched filter processed spectrum 317. This spectrum 317 is then channel equalized by multiplying the spectrum of channel spectrum 310 with spectrum 317 by multiplier 309 to equalize channel effects determined by an earlier channel probe (not shown for purposes of clarity). Output of multiplier 309 is a matched filtered and channel equalized spectrum 318, which is stored in 2N output frequency array 311. A portion of spectrum 318 stored in output array 311 is aliased by frequency domain folding 312 as the spectrum is transferred to N-point output frequency array 313. In other words, a shaped and channel corrected spectrum is downsampled by "intentional" aliasing of this spectrum. Intentional aliasing is used to distinguish from aliasing that may be a byproduct of signal processing. The processed and aliased spectrum in output array 313 is transformed to the time domain by N-point IFFT block 314. The output of N-point IFFT block 314 is placed in output time array 315 for subsequent output as a time domain processed and aliased spectrum 316.

Figure 4:
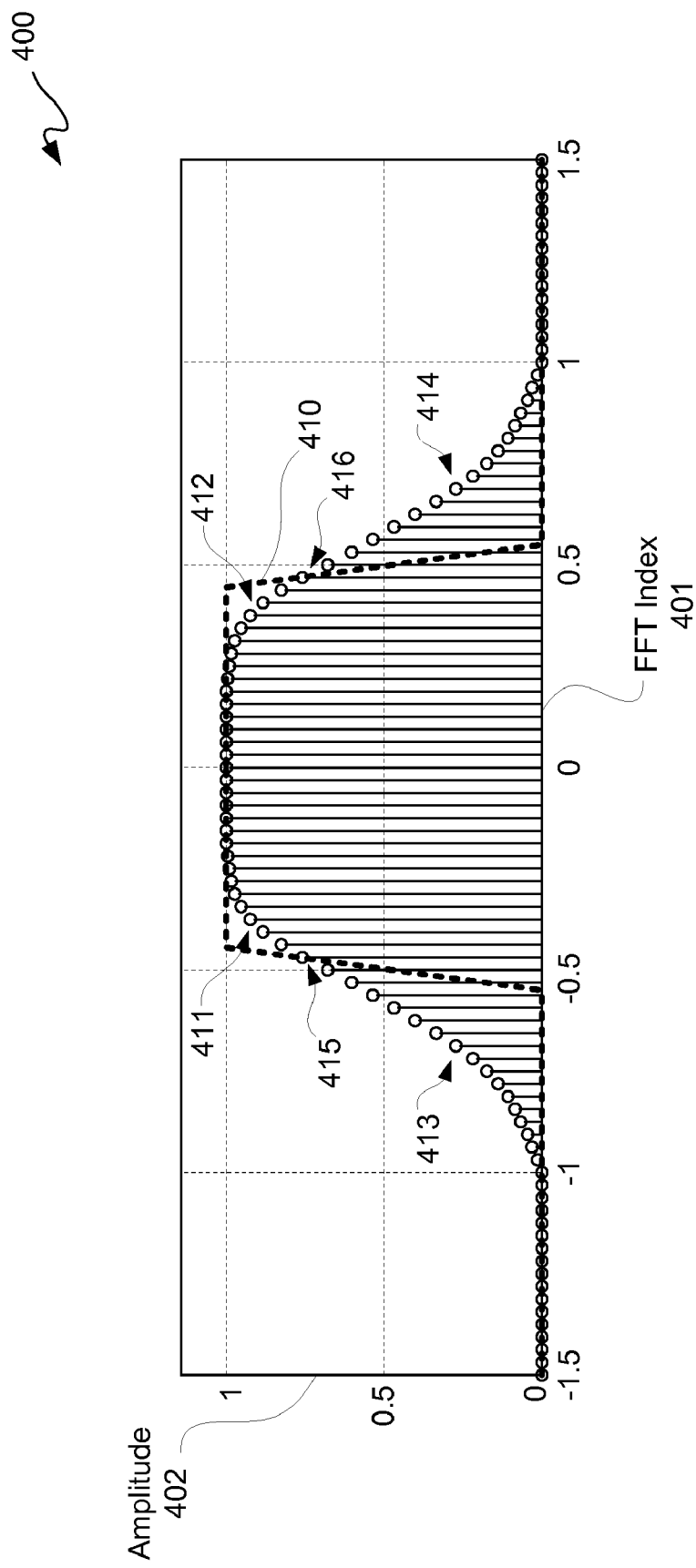
FIG. 4 is a graph depicting an exemplary embodiment of a spectrum for a harris-Moerder square root-Nyquist filter.
Figure 5:
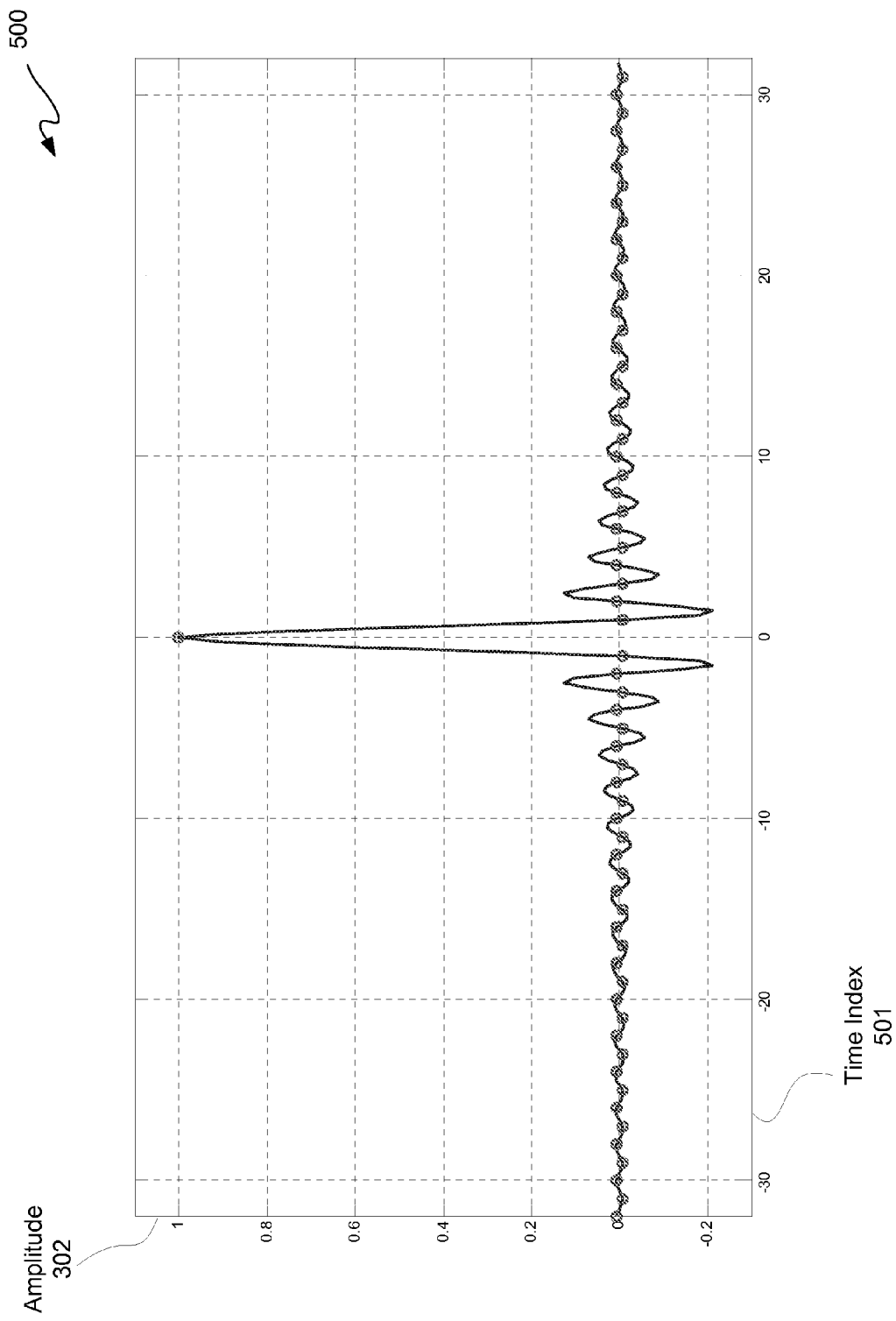
FIG. 5 is a graph depicting an exemplary embodiment of a time series for an unshaped (i.e., rectangle spectrum) square root-Nyquist filter.
Figure 6:
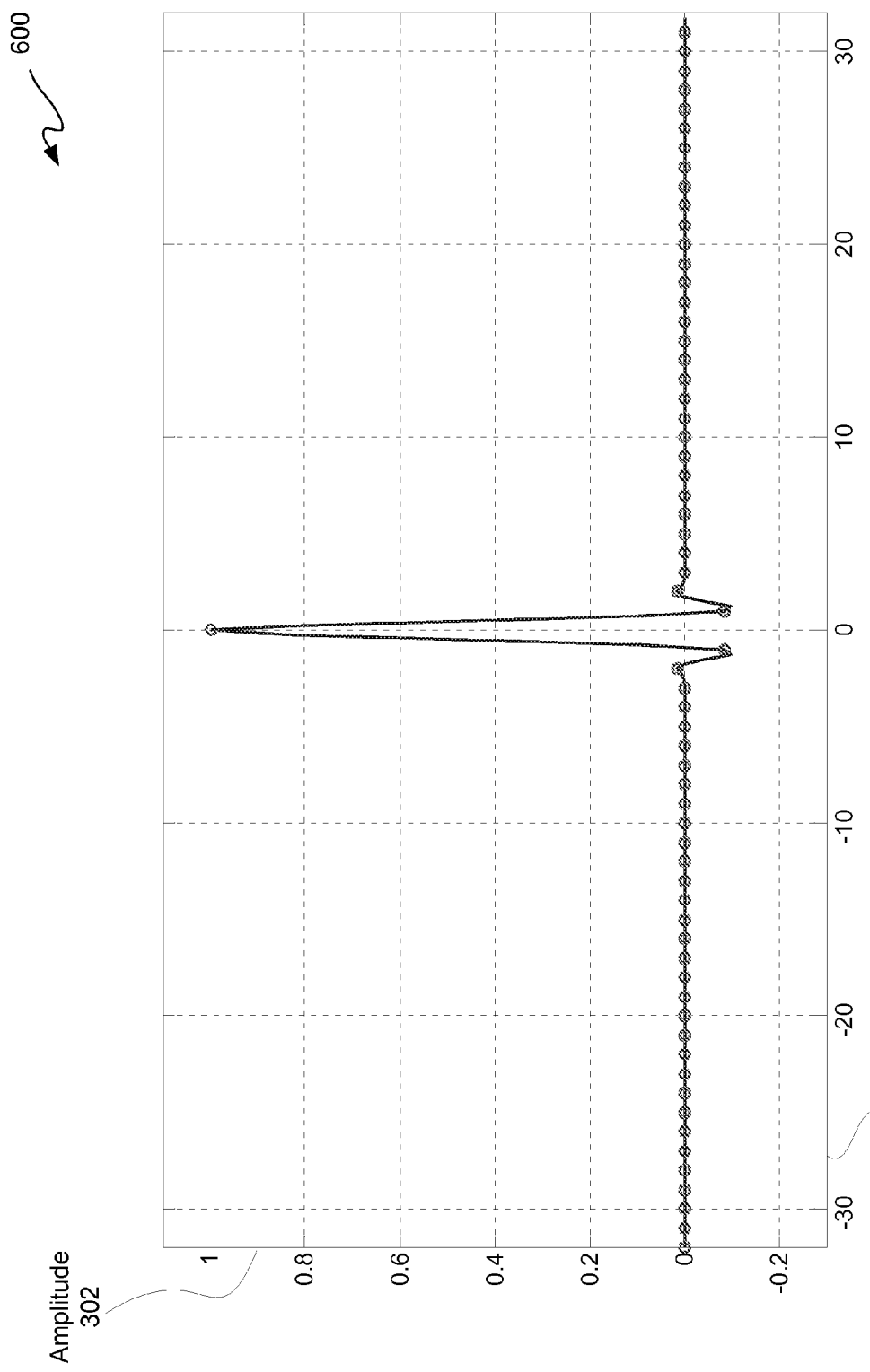
FIG. 6 is a graph depicting an exemplary embodiment of a time series for a one-hundred percent (100%) excess bandwidth harris-Moerder square-root Nyquist filter.

FIG. 4 is a graph depicting an exemplary embodiment of a spectrum 400 for a harris-Moerder square root-Nyquist filter. FIGS. 5 and 6 are a pair of graphs depicting an exemplary embodiment of a time series 500 and 600 for a harris-Moerder square root-Nyquist filter. FIG. 5 shows the time series for 0% excess bandwidth. FIG. 6 shows the time series for 100% excess bandwidth. Spectrum 410 and time series 500 correspond to one another, and spectrum portions 411 through 416, namely collectively spectrum 400, and time series 600 correspond to one another. In each of FIGS. 4 and 6 there is 100% excess bandwidth. This spectral expansion is used to affect time domain sidelobes.

More particularly, with reference to FIG. 4, FFT index 401 is shown versus amplitude 402 for spectrum 400. A conventional spectrum is generally indicated by dashed line 410. There is a time domain sidelobe reduction due to the spectral shaping at 411, 412, 413, and 414 between spectrum 400 and conventional spectrum 410, along with a spectral expansion as generally indicated at 413 and 414 extending outside the envelope of the conventional spectrum 410. The expected gain at each edge of spectrum 400, namely gain generally at locations 415 and 416 for the intersection of spectrum 400 and conventional spectrum 410, in this example is approximately 0.707 of symbol bandwidth.

With reference to FIGS. 5 and 6, time series 500 and 600 respectively generally indicate by time index 501 and 601 and amplitude 502 and 602 that each is for four samples per symbol as previously described with reference to up-sampling in FIG. 2. Time series 500 and 600 each have an amplitude of 1 at non-causal bit time index 0.

Figure 7:
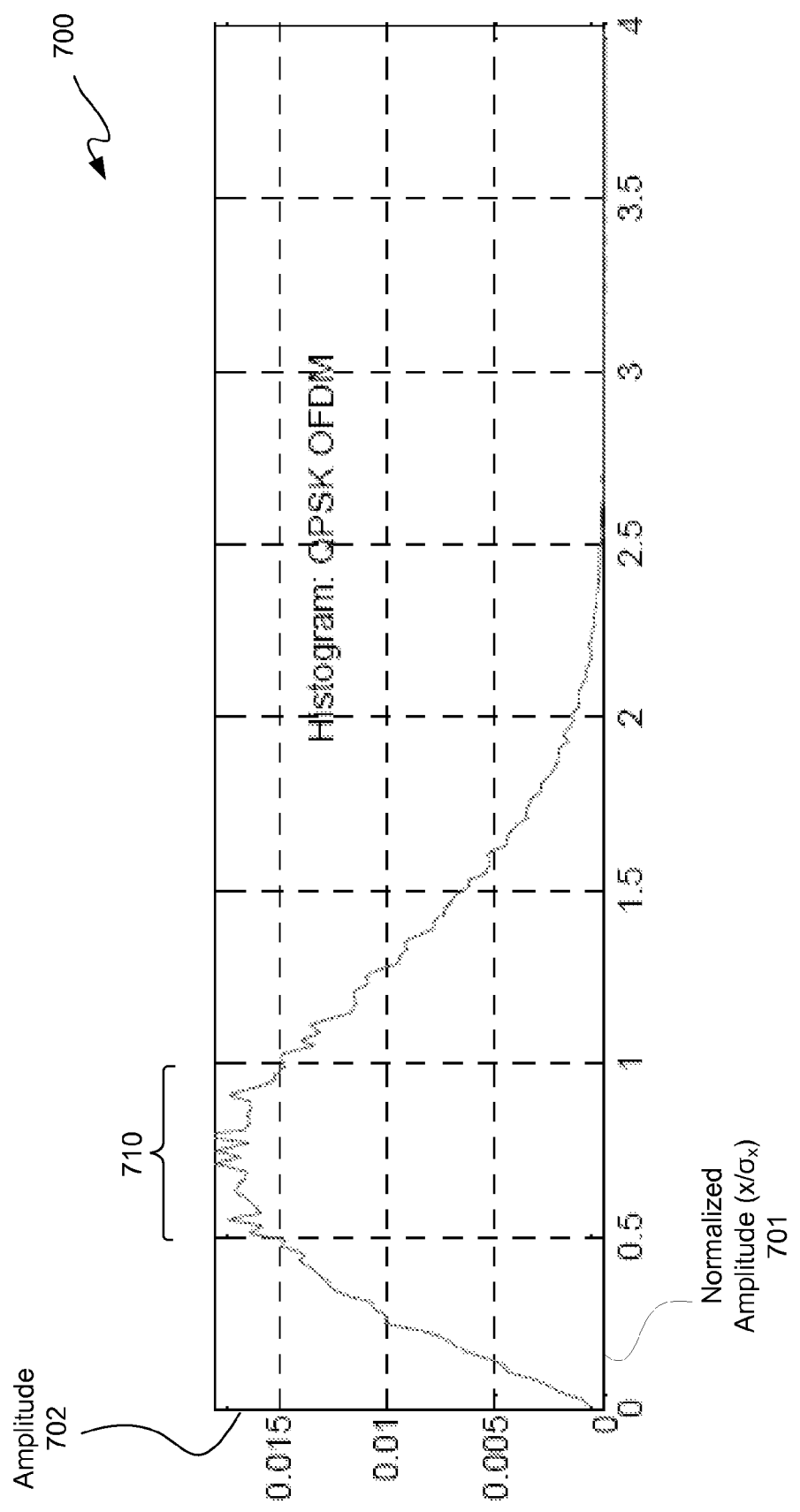
FIGS. 7 and 8 are graphs depicting respective exemplary embodiments of histograms for normalized amplitude of standard OFDM and of a 100% excess bandwidth harris-Moerder square-root Nyquist filter shaped OFDM.
Figure 8:
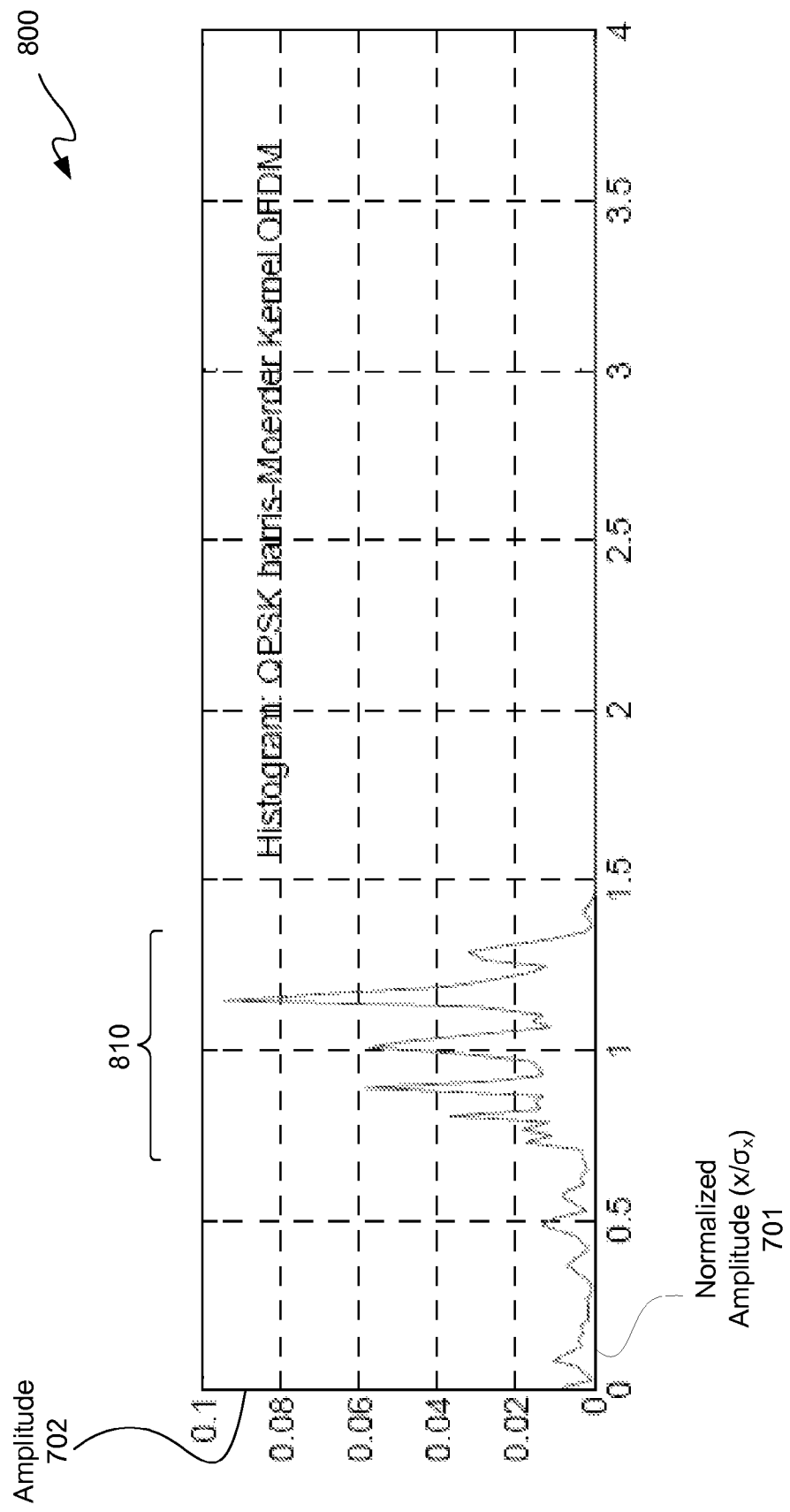

FIGS. 7 and 8 are graphs depicting respective exemplary embodiments of histograms 700 and 800. Each of histograms 700 and 800 is for normalized amplitude 701 versus amplitude 702. Normalized amplitude may generally be mathematically expressed as $x/\sigma_x$.

Histogram 700 is for a conventional OFDM modulator and histogram 800 is for modulator 200 of FIG. 2 with a harris-Moerder square root-Nyquist filter with 100% excess bandwidth, namely harris-Moerder kernel OFDM modulator. The input for both modulators used to produce histograms 700 and 800 is the same, namely a quadrature-phase shift keyed ("QPSK") constellation. It should be appreciated that peaks 810 of histogram 800 are substantially more distinct than peaks 710 of histogram 700. Accordingly, this means that there is a substantially smaller amount of coupling between offset symbols in modulator 200 of FIG. 2.

Figure 9:
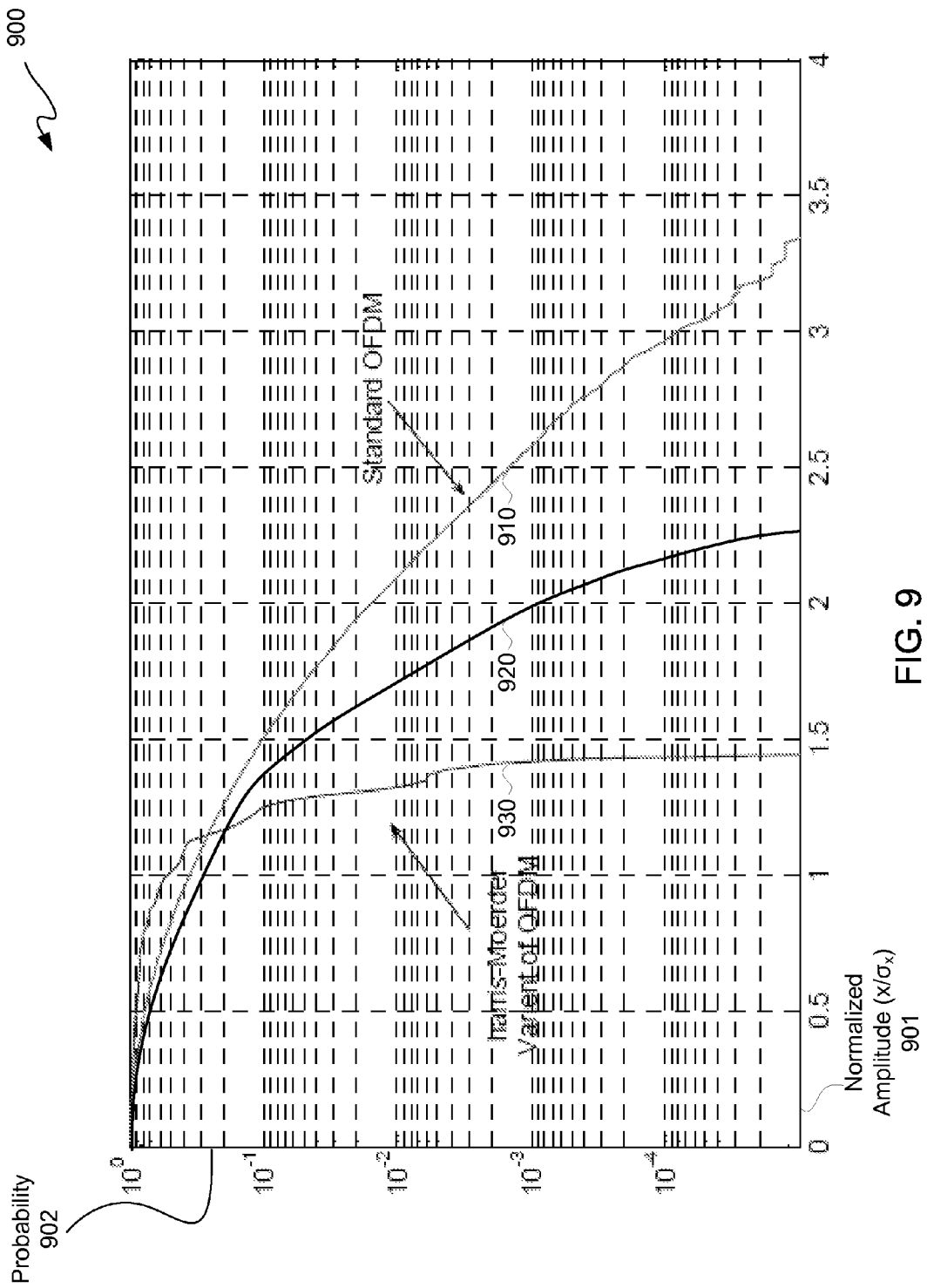
FIG. 9 is a graph depicting an exemplary embodiment of a probability of level crossing for standard OFDM, for unshaped Dirichlet kernel, and for shaped Dirichlet kernel.

FIG. 9 is a graph depicting an exemplary embodiment of a probability of level crossing 900. More particularly, normalized amplitude 901 versus probability 902 is illustratively shown for curves 910, 920, and 930. Curves 910, 920, and 930 are complementary cumulative density functions for same modulation sets for three separate modulators. Curve 910 is a complementary cumulative density function for a conventional OFDM modulator for 64 QPSK bins in a 256-point FFT. Curve 920 is a complementary cumulative density function for an unshaped Dirichlet kernel OFDM modulator output. The modulation set for curve 920 is 64 QPSK kernels in a 256-point FFT. Lastly, curve 930 is for modulator 200 of FIG. 2 with a harris-Moerder square root-Nyquist filter for shaping filter 206. The modulation set used to provide curve 930 was the same as that used to provide curve 920.

Curve 930 has lower overall normalized amplitude and in particular lower normalized amplitude basically for probabilities of $10^{-1}$ and smaller. More particularly, there is a reduction of peak amplitude relative to average amplitude from approximately 3.14 to approximately 1.45, which represents a drop of approximately 7.4 decibels in peak power level. In other words, PAPR has been reduced, though with an increase in bandwidth. Comparing curves 910, 920, and 930, peak-to-average amplitude ratios are respectively approximately 3.26, approximately 2.30, and approximately 1.44 for PAPRs of approximately 10.3 dB, approximately 7.2 dB, and approximately 3.1 dB, respectively. Thus generally approximately a 7 dB improvement in average power for a peak power limited amplifier may be obtained.

Figure 10:
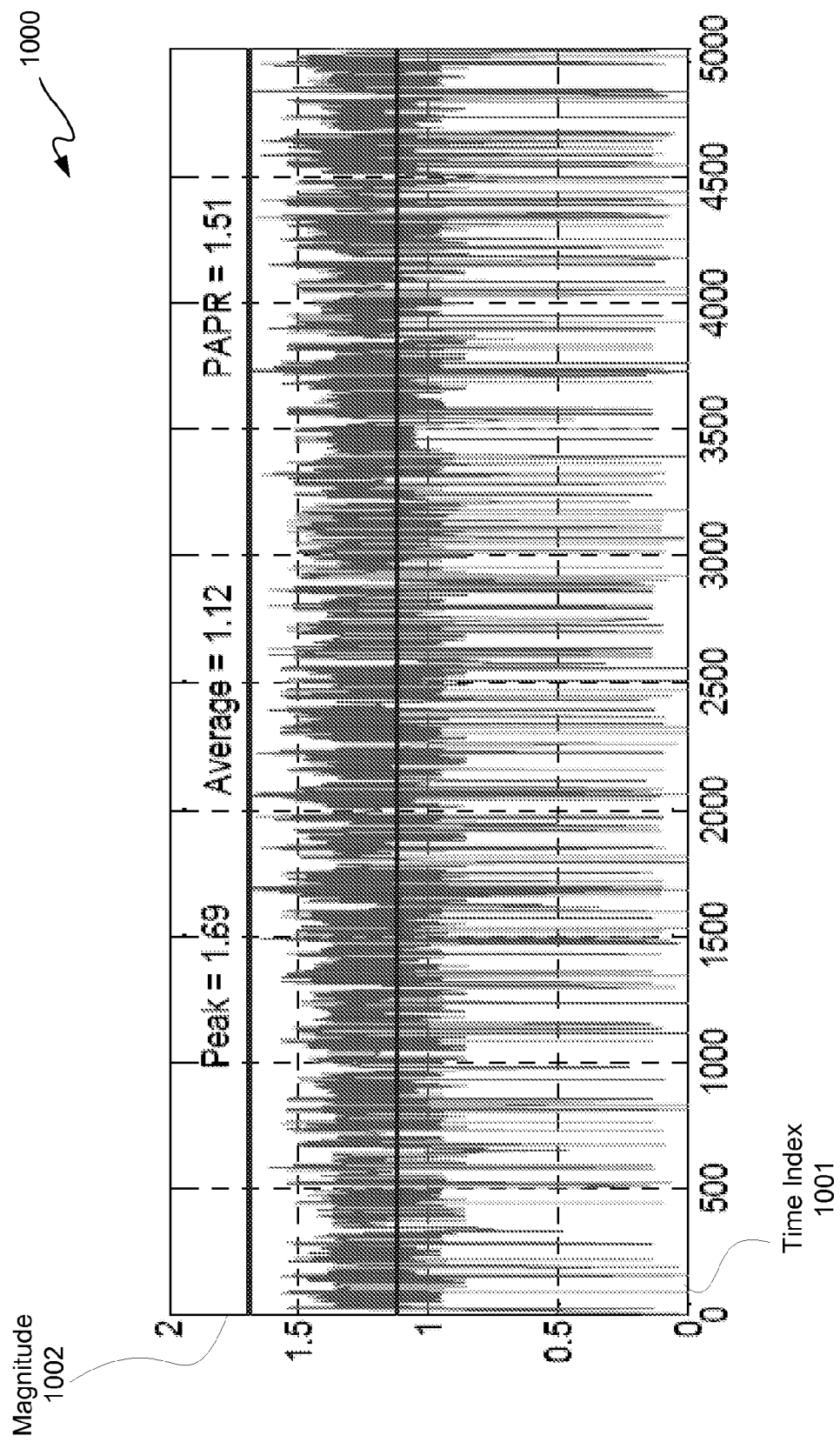
FIG. 10 is a signal diagram depicting an exemplary embodiment of a magnitude of complex envelope.

FIG. 10 is a signal diagram depicting an exemplary embodiment of a magnitude of complex envelope 1000. Envelope 1000 is for a harris-Moerder kernel QPSK modulated OFDM modulator output, such as of modulator 200 of FIG. 2, as indicated by time index 1001 versus magnitude 1002 for 100% excess bandwidth. In this example, a peak of approximately 1.69 was obtained with an average peak of approximately 1.12, and the average PAPR for envelope 1000 is approximately 1.51. Envelope 1000 is for 1,000 harris-Moerder shaped OFDM symbols as shaped by shaping filter 206 of FIG. 2, and indicates a significant reduction in spectral side lobes. Symbols used to generate envelope 1000 contained a tapered cyclic prefix as well as a tapered cyclic suffix to further control spectral side lobes.

Figure 11:
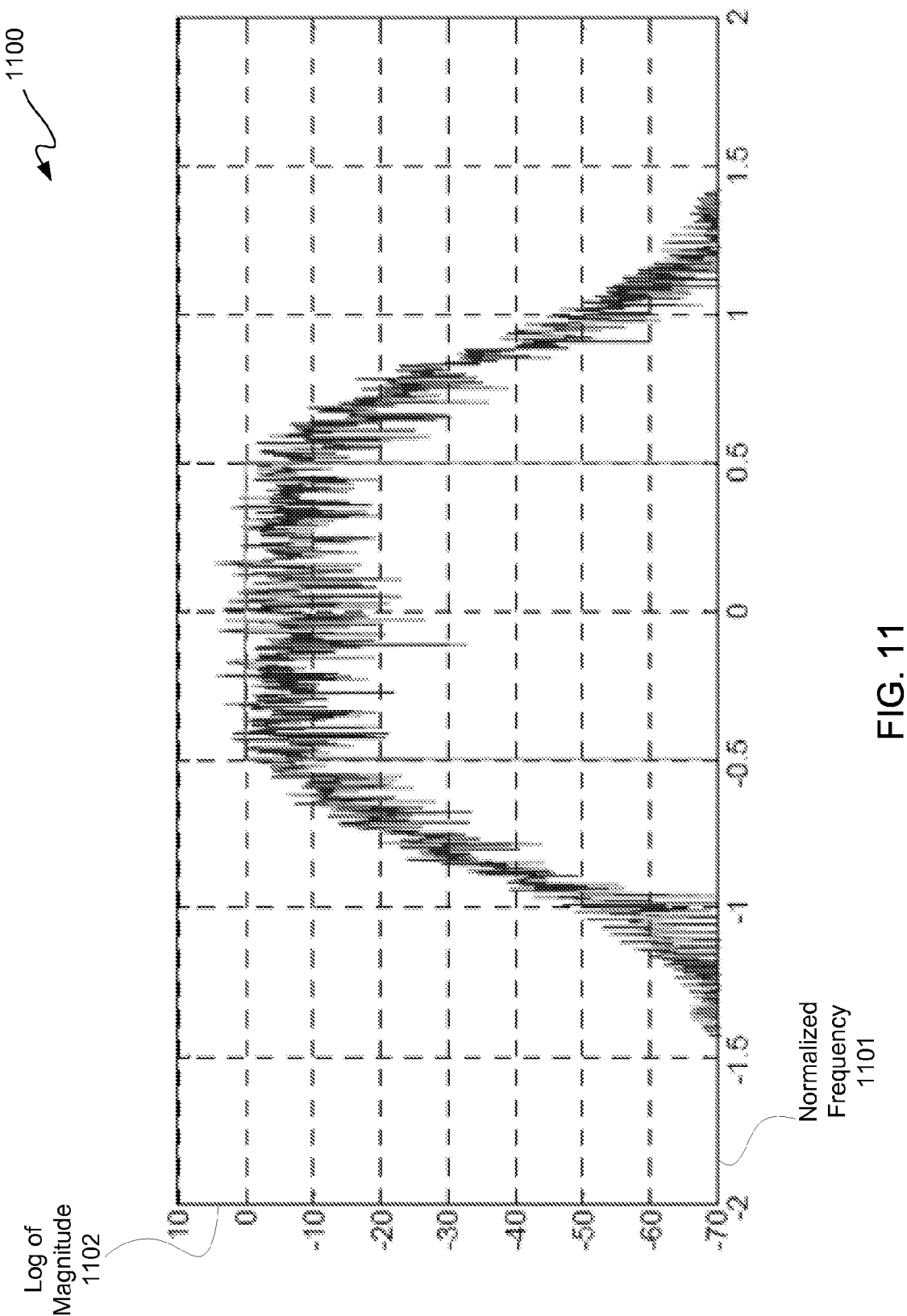
FIG. 11 is a graph depicting the spectrum of the envelope of FIG. 10.

FIG. 11 is a graph depicting the spectrum of the envelope of envelope 1000 of FIG. 10. In other words, normalized frequency 1101 versus log of magnitude in decibels 1102 for a spectrum 1100 of harris-Moerder kernel modulated OFDM symbols with a tapered cyclic prefix and a tapered cyclic suffix obtained from output of modulator 200 of FIG. 2.

Spectral shaping of a Dirichlet kernel to reduce PAPR has been described. More particularly, such shaping has been described in the context of OFDM signaling. Furthermore, such OFDM example was for Single Carrier OFDM signaling or Dirichlet kernel OFDM signaling; however, it should be appreciated that other versions of OFDM signaling may be used.

An OFDM signal may be formed as a weighted sum of time displaced Dirichlet or Dirichlet-like, or more generally periodic square root sinc function, kernels. Such displaced kernels interact through their sidelobes. As described herein, kernel sidelobe amplitude may be significantly reduced by spectral shaping and bandwidth expansion for a reduction in PAPR.

Figure 12:
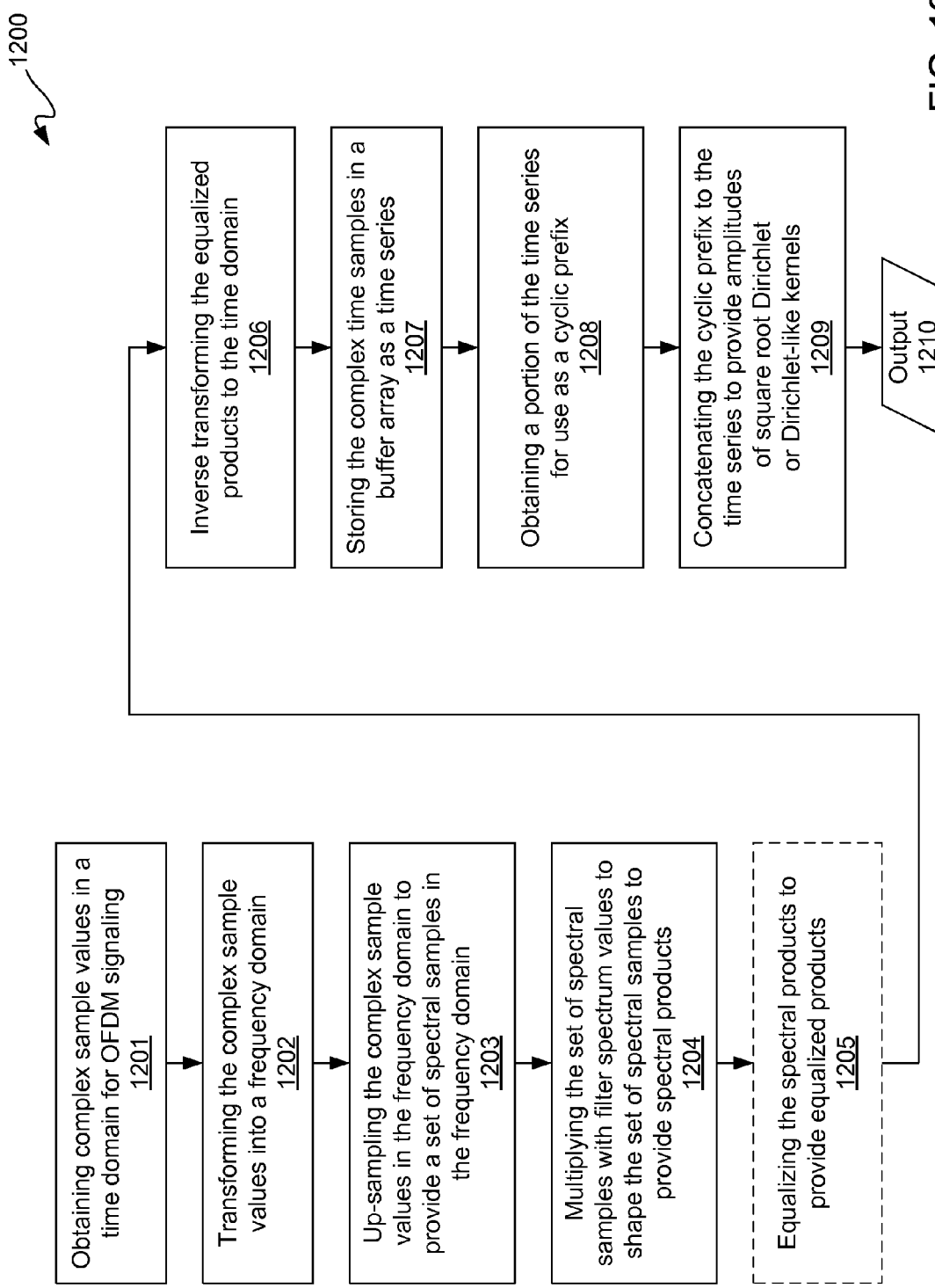
FIG. 12 is a flow diagram depicting an exemplary embodiment of a harris-Moerder Shaped OFDM peak-to-average power ratio ("PAPR") reduction flow.

FIG. 12 is a flow diagram depicting an exemplary embodiment of a PAPR reduction flow 1200 for a modulator. At 1201, complex sample values in a time domain are obtained for OFDM signaling as part of flow 1200. As previously described, such OFDM signaling may be a Single Carrier OFDM or a Dirichlet kernel OFDM type of signaling.

At 1202, the complex sample values obtained at 1201 are transformed into a frequency domain. Again, this may be done with an FFT. Alternatively, a Discrete Fourier Transform ("DFT") may be used.

At 1203, the complex sample values converted to the frequency domain are up-sampled to provide a set of spectral samples in the frequency domain. Again, this up-sampling may be a 4-to-1 up-sampling or some other ratio of up-sampling.

At 1204, the set of spectral samples are multiplied with values produced by a filter spectrum to shape the set of spectral samples to provide spectral products. The spectral products are shaped responsive to the filter spectrum. Examples of filters that may be used have been previously described herein.

Optionally, at 1205, the spectral products may be corrected by inverse channel weights to provide pre-equalized products. Pre-equalized products may be inversely transformed at 1206 from the frequency domain to the time domain. Again, an IFFT may be used or an Inverse Discrete Fourier Transform ("IDFT") may be used for this inverse transformation.

At 1207, the matched filtered, pre-equalized, and down-sampled products, now in the time domain, ("complex time samples") are stored in a buffer array as a time series. At 1208, a portion of the time series may be obtained from storage at for use as a cyclic prefix. Furthermore, it should be appreciated that a portion of such time series which is a cyclic prefix for one frame of data may also be used as a cyclic postfix or suffix for another frame of data. Furthermore, such cyclic prefix and cyclic suffix or postfix may be tapered.

At 1209, the cyclic prefix obtained at 1208 is concatenated with the entire time series stored at 1207 to provide an output 1210. Output 1210 is amplitudes of square root Dirichlet or Dirichlet-like kernels.

Figure 13:
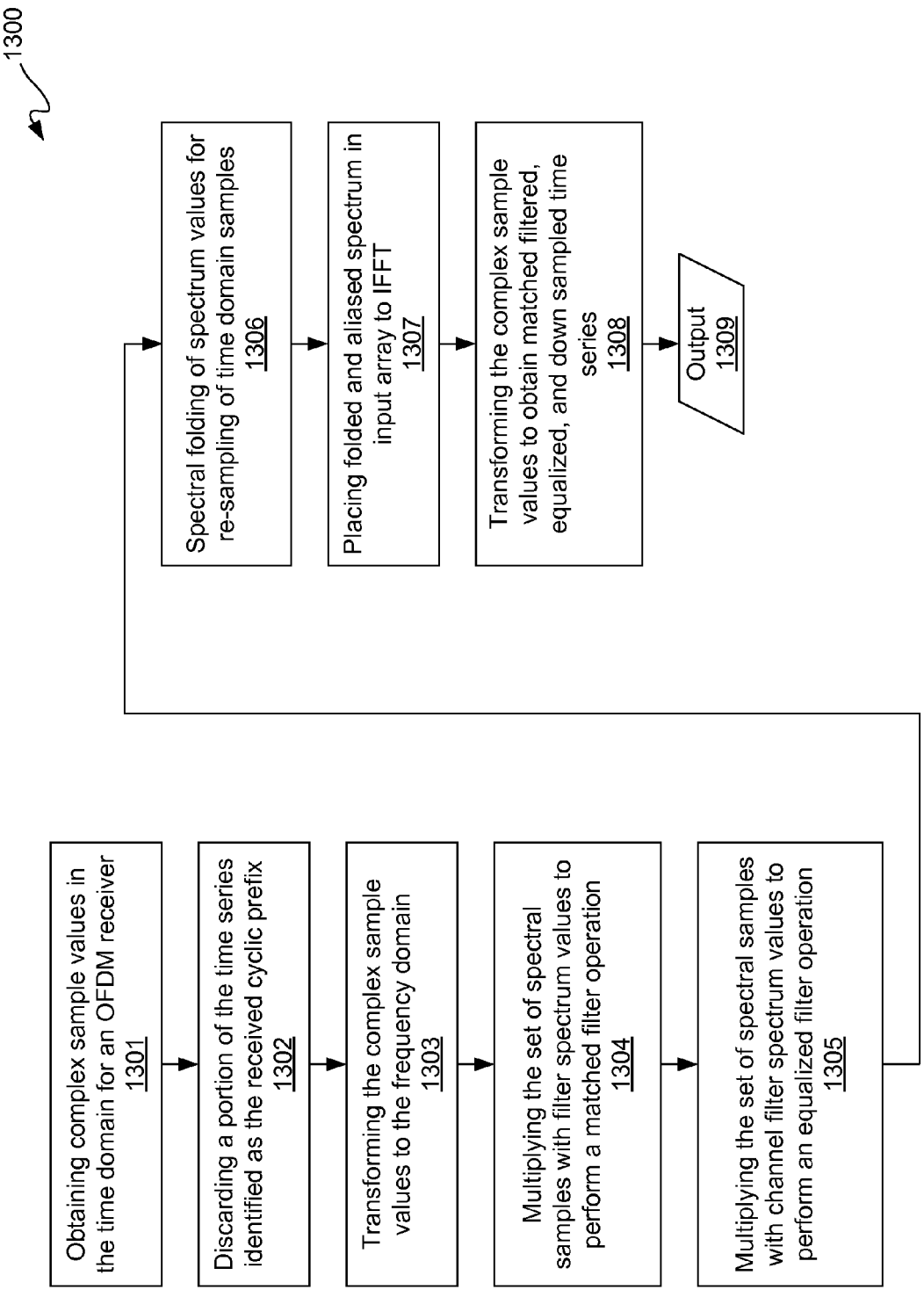
FIG. 13 is a flow diagram depicting an exemplary embodiment of a PAPR reduction flow for a demodulator.

FIG. 13 is a flow diagram depicting an exemplary embodiment of a PAPR reduction flow 1300 for a demodulator. At 1301, complex sample values in the time domain are obtained by an OFDM receiver as OFDM signaling as part of flow 1300. As previously described, such OFDM signaling may be a Single Carrier OFDM or a Dirichlet kernel OFDM type of signaling.

At 1302, a portion of the time series of the complex sample values obtained at 1301 is discarded as a cyclic prefix. At 1303, the time series, less the cyclic prefix, is transformed into a frequency domain to provide a set of spectral samples. This may be done with an FFT or a DFT. At 1304, the set of spectral samples is multiplied with filter spectrum values to perform a matched filter operation. Examples of filters that may be used include a harris-Moerder square root Nyquist filter and a harris-Nyquist-2 filter, as have been previously described herein.

At 1305, the set of spectral samples shaped by the matched filter operation are multiplied with channel filter spectrum values to perform an equalizing filter operation. The equalizer filter may be applied here at the demodulator but may also be applied as previously shown, as an option, at 1205 in the modulator. In some embodiments, initial channel estimates may be corrected at the modulator and channel updates may be corrected at the demodulator. At 1306, spectrum values from the output of the equalizing filter operation may be spectra folded for re-sampling of time domain samples to provide a folded and aliased spectrum. In other words, a portion of the spectrum values are folded and another portion of the spectrum values are left unfolded.

At 1307, the folded and aliased spectrum may be put into a buffer array that feeds an IFFT block for subsequently inversely transforming such spectrum. At 1308, such spectrum is inverse transformed from the frequency domain to the time domain to provide a matched filtered, equalized, and down-sampled time series output 1309. An IFFT may be used or an IDFT may be used for this inverse transformation. Output 1309 is amplitudes of square root Dirichlet or Dirichlet-like kernels.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An orthogonal frequency division multiplexed ("OFDM") modulator, comprising:
a Fourier Transform block coupled to receive first values in the time domain and configured to transform the first values into second values;
the second values being in the frequency domain;
an up-sampler coupled to receive the second values and configured to up-sample the second values to provide third values;
the third values being greater in number than the second values;
a multiplier coupled to receive the third values;
a shaping filter having a spectrum;
the shaping filter coupled to the multiplier;
the multiplier configured to multiply the third values with the spectrum to shape and interpolate the third values to provide fourth values;
the fourth values being spectral products being shaped responsive to the spectrum of the shaping filter;
a first output array coupled to receive the spectral products and configured to provide equalized products;
an Inverse Fourier Transform block coupled to the first output array to receive the equalized products and configured to transform the equalized products into fifth values;
the fifth values representing modulated OFDM signaling;
a second output array coupled to the Inverse Fourier Transform block to receive the fifth values; and
a third output array coupled to the second output array to obtain a portion of the fifth values for use as a cyclic prefix and coupled to obtain the fifth values from the second output array.

2. The modulator according to claim 1, wherein the third output array is configured to concatenate the cyclic prefix with the fifth values for output as amplitudes of Dirichlet or Dirichlet-like kernels.

3. The modulator according to claim 1, wherein the shaping filter is a harris-Moerder square root Nyquist filter.

4. The modulator according to claim 1, wherein the shaping filter is a harris-Nyquist-2 filter.

5. The modulator according to claim 1, wherein the Fourier Transform block is configured to interpolate the first values to provide the second values.

6. The modulator according to claim 1, wherein the OFDM signaling is of a Single Carrier OFDM type.

7. An orthogonal frequency division multiplexed ("OFDM") demodulator, comprising:
a Fourier Transform block coupled to receive first values in the time domain and configured to transform the first values into second values in the frequency domain;
a first multiplier coupled to receive the second values;
a shaping matched filter having a spectrum and being coupled to the first multiplier;
the first multiplier configured to multiply the second values with the spectrum to shape the second values to provide third values as spectral products;
the spectral products being shaped responsive to the spectrum of the shaping filter;
a second multiplier coupled to receive the third values;
the second multiplier coupled to an equalizer filter having a channel equalizer spectrum;
the second multiplier configured to multiply the third values with the channel equalizer spectrum to provide fourth values;
a first output array buffer coupled for receiving the fourth values;
a second output array buffer coupled to the first output array buffer for folding part of a spectrum represented by the fourth values for aliasing thereof to provide fifth values;
the fifth values being the folded part of the fourth values and a remainder of the fourth values;
an Inverse Fourier Transform block coupled to receive the fifth values and configured to transform the fifth values to the time domain to provide sixth values; and the sixth values representing demodulated OFDM signaling.

8. The demodulator according to claim 7, wherein the equalizer filter is preconfigured with the channel equalizer spectrum responsive to a channel probe result.

9. The demodulator according to claim 8, further comprising:
   a first input array buffer coupled to receive complex samples;
   the first input array buffer is configured to delineate a cyclic prefix as part of the complex samples; and
   a second input array buffer is coupled to receive the complex samples less the cyclic prefix as the first values.

10. The demodulator according to claim 9, further comprising:
    a third input array buffer coupled to the Fourier Transform Block for receiving the second values and providing the second values to the first multiplier; and
    a third output array buffer coupled to the Inverse Fourier Transform Block for receiving the sixth values and outputting the sixth values as the OFDM signaling.

11. The demodulator according to claim 10, wherein the shaping filter is a harris-Moerder square root Nyquist filter.

12. The demodulator according to claim 10, wherein the shaping filter is a harris-Nyquist-2 filter.

13. A method for orthogonal frequency division multiplexed ("OFDM") modulation, comprising:
    obtaining first complex sample values in a time domain for OFDM signaling;
    transforming the first complex sample values into a frequency domain;
    up-sampling the first complex sample values in the frequency domain to provide a set of spectral samples in the frequency domain; and
    multiplying the set of spectral samples with a filter spectrum to shape and interpolate the set of spectral samples to provide first spectral products;
    the first spectral products being shaped responsive to the filter spectrum;
    pre-equalizing the first spectral products to provide pre-equalized products;
    storing the pre-equalized products;
    inverse transforming the pre-equalized products shaped from the frequency domain to the time domain to provide second complex sample values;
    obtaining a portion of the pre-equalized products in the time domain for use as a cyclic prefix; and
    concatenating the cyclic prefix with the pre-equalized products in the time domain to provide amplitudes of square root Dirichlet kernels.

14. The method according to claim 13, wherein the first complex sample values and the second complex sample values are for OFDM signaling; and wherein the OFDM signaling is of a Single Carrier OFDM type.

15. The method according to claim 13, wherein the filter spectrum is from a harris-Nyquist-2 filter.

16. The method according to claim 13, wherein the filter spectrum is from a harris-Moerder square root Nyquist filter.

17. The method according to claim 16, wherein:
    the transforming is a Fast Fourier Transform;
    the inverse transforming is an Inverse Fast Fourier Transform;
    the first complex sample values are Quadrature Phase Shift Keyed; and
    the up-sampling is a 1-to-4 up-sample.

18. The method according to claim 13, further comprising demodulating the second complex sample values, the demodulating including:
    discarding a cyclic prefix portion of the second complex sample values to provide first values;
    Fourier Transform transforming the first values from the time domain to the frequency domain to provide second values;
    multiplying the second values with a shaping matched filter spectrum to shape the second values to provide third values as second spectral products;
    the second spectral products being shaped responsive to the spectrum of the shaping filter;
    multiplying the third values with a channel equalizer spectrum to provide fourth values;
    folding part of a spectrum represented by the fourth values for aliasing thereof to provide fifth values;
    the fifth values being the folded part of the fourth values and a remainder of the fourth values;
    Inverse Fourier Transform transforming the fifth values to the time domain to provide sixth values; and
    the sixth values representing demodulated OFDM signaling.

* * * * *